(12) United States Patent
Wolfe et al.

(10) Patent No.: US 8,776,773 B1
(45) Date of Patent: Jul. 15, 2014

(54) AIR IMPINGEMENT TUNNEL OVEN

(75) Inventors: Ronald D. Wolfe, Wichita, KS (US);
Steven M. Wolfe, Wichita, KS (US);
Brent Staver, Maize, KS (US)

(73) Assignee: Wolfe Electric, Inc., Wichita, KS (US)

( * ) Notice: Subject to any disclaimer, the term of this patent is extended or adjusted under 35 U.S.C. 154(b) by 0 days.

(21) Appl. No.: 13/595,302

(22) Filed: Aug. 27, 2012

(51) Int. Cl.
*F24C 15/32* (2006.01)

(52) U.S. Cl.
USPC .................. 126/21 A; 126/21 R; 432/152

(58) Field of Classification Search
USPC .............. 126/21 A, 21 R; 432/144, 145, 152; 99/443 C; 34/181
See application file for complete search history.

(56) References Cited

U.S. PATENT DOCUMENTS

| | | | | |
|---|---|---|---|---|
| 5,997,280 | A | * | 12/1999 | Welz et al. ...................... 431/90 |
| 2010/0104997 | A1 | * | 4/2010 | Wolfe et al. ................... 432/152 |

* cited by examiner

*Primary Examiner* — Alfred Basichas
(74) *Attorney, Agent, or Firm* — Kenneth H. Jack; Davis & Jack, L.L.C.

(57) ABSTRACT

An air impingement tunnel oven including a baking case having a plurality of walls, the case's interior having high and low pressure zones; a food conveyor spanning between food passage ports; a plenum and air impingement registers combination having pluralities of finger ducts overlying and underlying the food conveyor, each finger duct being attached to and extending from the plenum, and the plenum dividing the baking case's high and low pressure zones; a gas burner supported upon one of the baking case's walls and including a shell and a gas tube within the shell, the shell defining an annulus which opens the baking case's low pressure zone; and an optical flame sensor operatively mounted for detecting burner flame light passing outwardly through the annulus.

4 Claims, 5 Drawing Sheets

AIR IMPINGEMENT TUNNEL OVEN

FIELD OF THE INVENTION

This invention relates to air impingement tunnel ovens which incorporate a pass through food conveyor, an internal plenum and finger ducts assembly for directing impingement air downwardly toward and upwardly toward food conveyed by the food conveyor, and which further incorporate a gas fired burner for heating air at a low pressure side of the oven's interior. More particularly, this invention relates to adaptations of such ovens for burner flame sensing.

BACKGROUND OF THE INVENTION

Conventional gas fired air impingement tunnel ovens are configured for directing a burner flame into an inaccessible or difficultly accessed low air pressure zone or air volume within the interior of the oven's baking case. Such low pressure zone is typically laterally bounded by the oven's lateral wall, and is oppositely laterally bound by an air plenum which effectively longitudinally partitions the oven's interior. In operation of such tunnel ovens, safety concerns require that the supply of combustible gas (typically natural gas or propane) to the burner be terminated upon extinguishment of the burner's flame.

To insure gas cutoff upon flame extinguishment, a gas cutoff valve is typically electronically controlled by an electronic control unit which is capable of receiving and being actuated by a termination or cessation of an ongoing electrical signal current. To generate such a signal to such controller, a pair of metal electrodes are known to be mounted and extended into such low pressure air volume within the baking case, such electrodes being positioned to intersect the path of the gas flame emanating from the burner. Upon maintenance of voltage or an electrical potential difference between such electrodes, a circuit including such electrodes is completed as a result of a micro-electroconductivity character of the flame.

Electric current from such completed flame incorporating electric circuit is commonly and conventionally utilized for maintaining an input signal to the electronic controller. While a burner flame is present, and during ongoing completion of such electrical circuit, the electronically controlled burner cutoff valve is maintained by the controller at an open position. Alternatively, upon flame extinguishment and a resultant breaking of the signal circuit, such valve is actuated by the controller to close and cutoff gas supply.

A problem or defect of such electrode dependent flame sensors is recognized as resulting from deposits of solid foreign matter from the combustible gas and flame onto the electrodes. Such solids cumulatively build up over time, and such solids tend to undesirably function as a resistor or dielectic acting as an insulator which interferes with flame conducted passage of electrical current from one electrode to the other. Upon such build up of such insulating solids, the oven's controller unit interprets a resultant interruption of current as a flame extinguishment event, and prematurely cuts off gas to the burner, unnecessarily shutting down operation of the oven.

Upon an accumulation of such insulating solids upon flame sensing electrodes, access to the oven's low pressure air volume which resides between the oven's lateral wall and plenum must be gained for electrode maintenance and electrode interchange. Such interior space of such oven typically cannot be achieved by a commercial oven user, requiring a service call by a technician or oven mechanic. Thus, flame sensing electrode fouling results in undesirable "down time" effecting usage of the oven and negatively impacting the operation of a commercial restaurant utilizing the oven.

The instant inventive air impingement tunnel oven solves or ameliorates the problems, defects, and deficiencies described above by replacing flame path mounting electrodes with a specially configured optical flame sensing assembly.

BRIEF SUMMARY OF THE INVENTION

A first structural component of the instant inventive air impingement tunnel oven comprises a baking case having an interior space defined by upper and lower walls, longitudinal and oppositely longitudinal walls, and lateral and oppositely lateral walls. In a preferred embodiment, such walls have stainless steel cladding on their interior and exterior surfaces and incorporate a layer of thermal insulating material there between. The lateral wall of the baking case is preferably specially adapted for supporting an electric blower motor, and the case's oppositely lateral wall preferably comprises an alternatively attachable and removable panel for access to the baking case's cooking space for cleaning.

Longitudinal and oppositely longitudinal walls of such baking case preferably present laterally oblongated food passage ports, and a continuous loop rack type food conveyor preferably spans between such ports and extends longitudinally through the baking case's interior.

An air plenum and air impingement registers combination is preferably mounted within the interior of such baking case, the impingement registers preferable comprising upper and lower pluralities of finger ducts which respectively reside above and below the food conveyor for respectively directing impingement air downwardly and upwardly toward food items carried by the conveyor. The air plenum component of such combination is preferably positioned at the lateral side of the conveyor, and each of the finger ducts is preferably fixedly attached to and extends oppositely laterally from the plenum. The air plenum preferably divides the baking case's interior into a lateral low pressure zone or air volume and an oppositely lateral high pressure zone or air volume. Preferably, the motor drives a fan or blower which draws air from the low pressure zone into the interior of the plenum for oppositely lateral emission into the finger ducts, and for further emissions as jets of air from the finger ducts. The relatively high pressure cooking space within the oven's case is typically easily accessed through removal of the oven's oppositely longitudinal wall panel. In contrast, the interior of the oven's low pressure zone which resides laterally from the plenum is typically difficultly accessed. The instant inventive tunnel oven advantageously avoids any mounting or placement of flame sensing components within such inaccessible zone.

A further structural component of the instant inventive air impingement tunnel oven comprises a gas burner which is mounted within and is supported upon one of the baking case's wall. In a preferred embodiment, the gas burner component is supported upon and at a lateral end of the oven's longitudinal wall or upon the oven's oppositely longitudinal wall. The gas burner component comprises an interior burner tube which acts as a venturi for drawing combustible gas into the tube's outer input end, and emitting such gas out of the tube's inner end where a flame is maintained. The gas burner component further comprises a box configured or cylindrical shell which encases burner tube, such shell defining an annulus about the burner tube. Inward combustion air flow through the annulus may be passive or blower assisted.

A further structural component of the instant inventive air impingement tunnel oven comprises a compact electronic optical flame sensor. During normal operation of the burner, a visual line of sight exists between the ignited burner flame which inwardly emanates from the inner end of the burner and the outward end of the annulus between the burner's shell and inner burner tube. The electronic optical flame sensor component of the instant invention is preferably operatively mounted and positioned at a relatively cool location outside of the burner case. Such positioning is facilitated by an outward extension of the annulus into such relatively cool space, the sensor being positioned both within the annulus and outside the baking case's wall.

The electronic optical flame sensor preferably constitutes a wide band flame detector of the type which is manufactured and publically sold by the BST Solutions GmbH Company. Such sensor also is preferably adapted for flame flicker rate sensing actuation to prevent false positive signals resulting from heated infrared and visible light emitting structures which surround the sensor and may continue to radiate after flame extinguishing event.

The optical flame sensing capability of the instant inventive tunnel oven advantageously obviates the utilization of flame sensing electrodes, and the instant invention advantageously avoids such electrodes' tendency to falsely signal flame extinguishment as a result of accumulations of insulating solids upon the electrodes. The instant invention also advantageously obviates any need for accessing the interior of the baking case for performance of flame sensor maintenance or interchange.

Accordingly, objects of the instant invention include the provision of structures, as described above, wherein such structures are arranged in manners described above, for achievement of beneficial functions, as described above.

Other and further objects, benefits, and advantages of the instant invention will become known to those skilled in the art upon review of the Detailed Description which follows, and upon review of the appended drawings.

DETAILED DESCRIPTION OF A PREFERRED EMBODIMENTS

Figure 1:
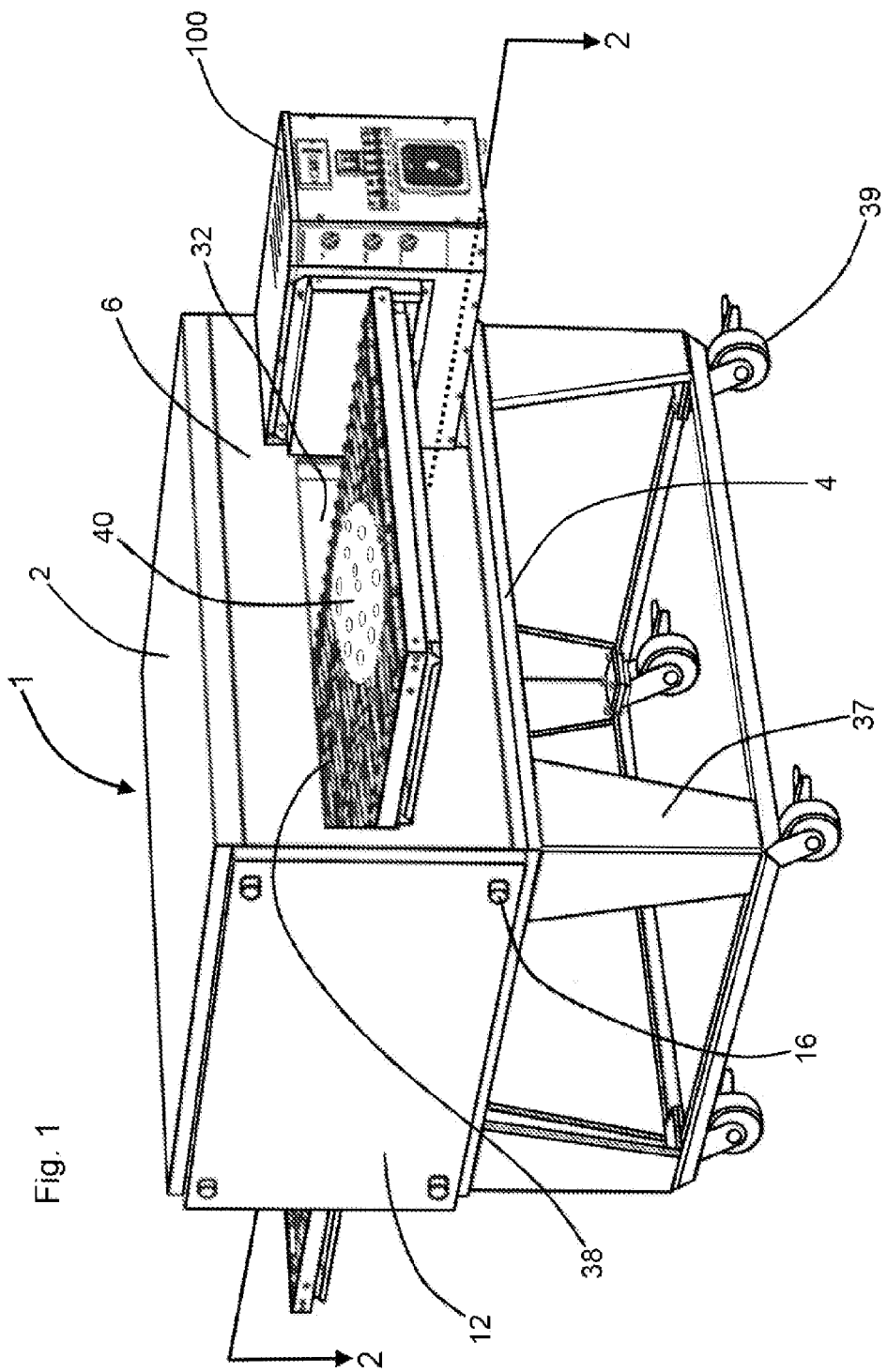
FIG. 1 is a perspective view of a preferred embodiment of the instant inventive air impingement tunnel oven.
Figure 2:
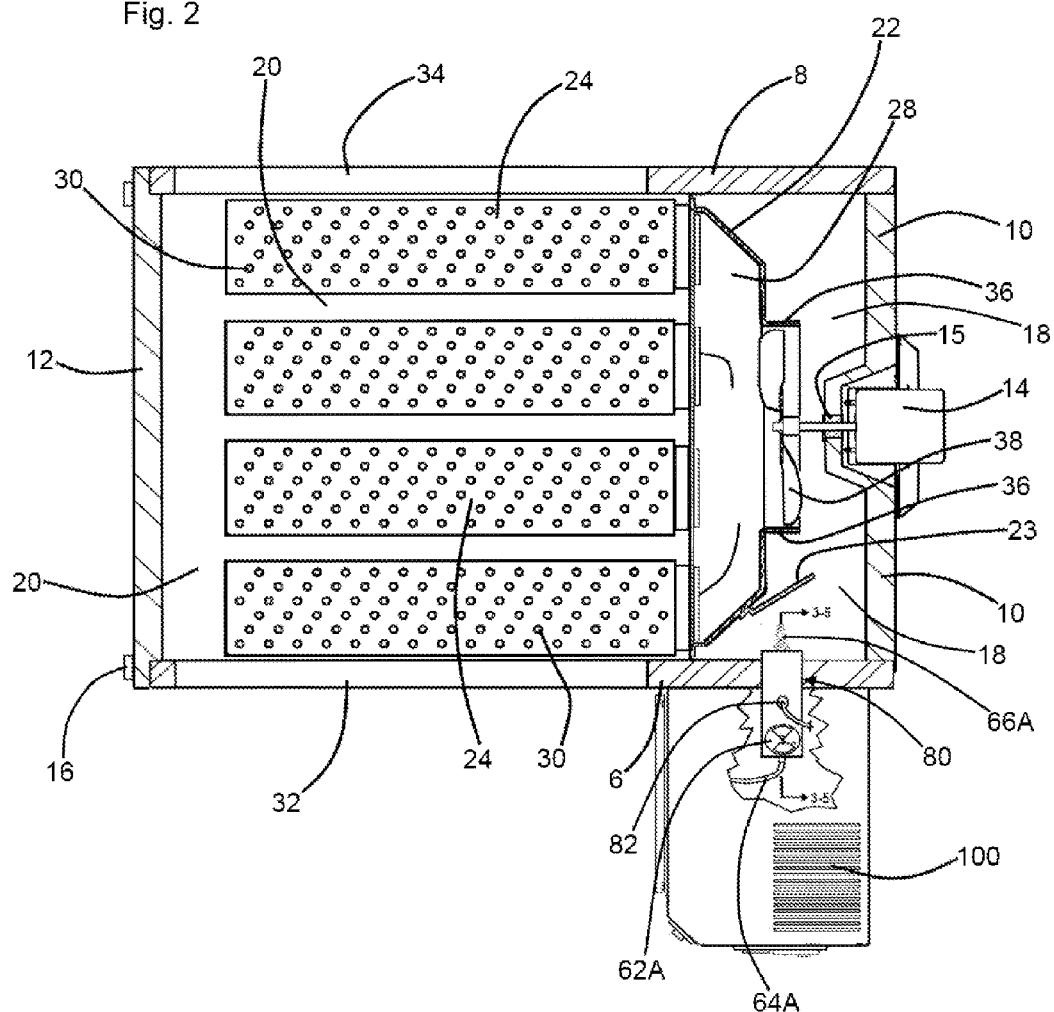
FIG. 2 is a sectional view as indicated in FIG. 1.
Figure 4:
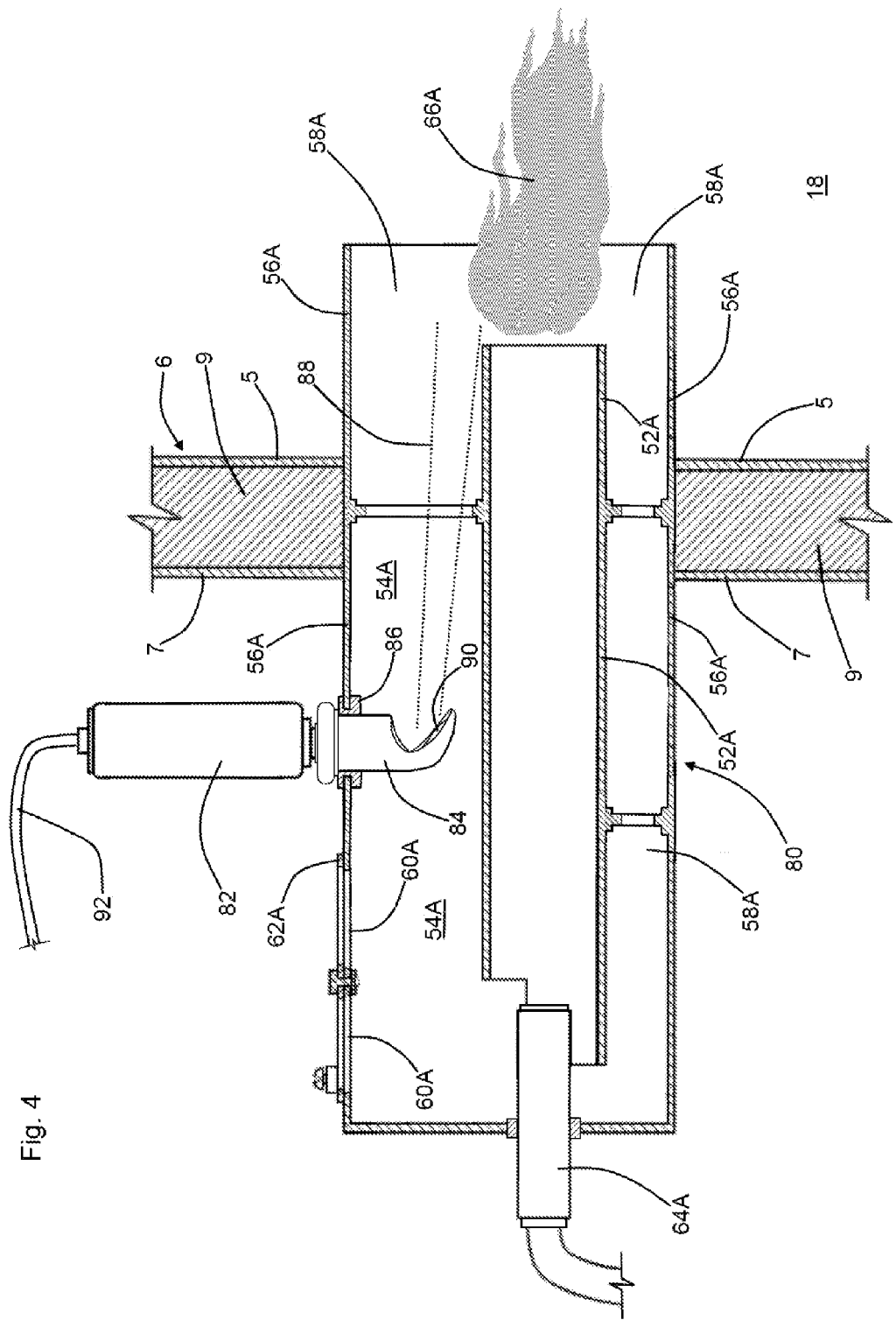
FIG. 4 is a sectional view of burner and optical flame sensor components of the instant inventive tunnel oven, such components being shown in accordance with the view indicated in FIG. 2.

Referring now to the drawings, and in particular to Drawing FIG. 1, a preferred embodiment of the instant inventive air impingement tunnel oven is referred to generally by Reference Arrow 1. A major structural component of the instant inventive air impingement tunnel oven 1 comprises a baking case which encloses an interior space which is defined by upper and lower walls 2 and 4. Referring further simultaneously to FIG. 2, the interior space of the baking case is preferably further defined by longitudinal and oppositely longitudinal walls 6 and 8, and by lateral and oppositely lateral walls 10 and 12. In a preferred embodiment, the lateral wall 10 is fixed, such wall providing mounting support for an electric fan or blower motor 14. The rotary power output axle of the electric motor 14 preferably extends through wall 10 at sealed bearing 15 for driving a fan 38. The oppositely lateral wall 12 is preferably adapted to facilitate cooking space access through panel removals and reattachments, such wall panel 12 having screw mounts 16. Referring further to FIG. 4, the inner and outer surfaces of the walls, including wall 6, of the baking case comprise stainless steel sheets 5 and 7, such sheets encasing a layer of thermal insulating material 9. The tunnel oven 1 is preferably supported upon a stand 37 having caster wheels 39.

Referring simultaneously to FIGS. 1 and 2, the interior space of the baking case is effectively divided into a lateral low pressure zone 18 and an oppositely lateral relatively high pressure zone 20. An air plenum 22 which is mounted within the interior of the baking case, and whose longitudinal and oppositely longitudinal ends are respectively fixedly attached to the case's longitudinal and oppositely longitudinal walls 6 and 8, effectively partitions the case's low and high pressure zones 18 and 20, such plenum partition 22 defining upper and lower return air flow gaps (not depicted within views) between the upper end of the plenum 22 and the upper wall 2, and between the lower end of the air plenum 22 and the lower wall 4.

Referring further simultaneously to FIGS. 1 and 2, a plurality of finger ducts or impingement air registers 24 are fixedly attached to and extend oppositely laterally from the air plenum 22, each finger duct 24 having a lateral inlet 26 which communicates with the interior 28 of the air plenum 22, each finger duct 24 further having a multiplicity of impingement air jet openings 30 which forcefully emit air into the case's high pressure air volume 20.

Referring further simultaneously to FIGS. 1 and 2, the case's high pressure air volume 20 is preferably opened by longitudinal and oppositely longitudinal food passage ports 32 and 34, such ports respectively extending through the case's longitudinal and oppositely longitudinal walls 6 and 8. A food conveyor 36 has a continuous loop food carrying grate 38 for transporting food items such as pizza 40 through the interior of the baking case. Such conveyor assembly 36,38 preferably spans between and extends through the longitudinal and oppositely longitudinal food passage ports 32 and 34. According to the sectional view of FIG. 2, a lower plurality of the finger ducts 24 is depicted as immediately underlying the conveyor assembly 36,38. A mirroring array of oppositely or downwardly oriented finger ducts (not depicted within views) preferably overlies the conveyor assembly 36,38 for downwardly directing impingement air against food items 40.

Referring further simultaneously to FIGS. 1 and 2, the lateral wall of the plenum 22 preferably presents a combined fan housing and air inlet 36. The fan 38 preferably rotates within the inlet housing 36 to draw air from the lateral air volume 18, and to drive such air into the interior 28 of the air plenum 22. The air then exits the air plenum 22 through finger duct inlets 26, to flow oppositely laterally through the finger ducts 24, and then to emit at impingement jets 30 as cooking speed enhancing impingement air. The air then flows laterally through the baking case's high pressure volume 20 as return air passing over and under the air plenum 22 for recirculation through the low pressure air volume 18, and for recirculation through the blower housing inlet 36.

Figure 3:
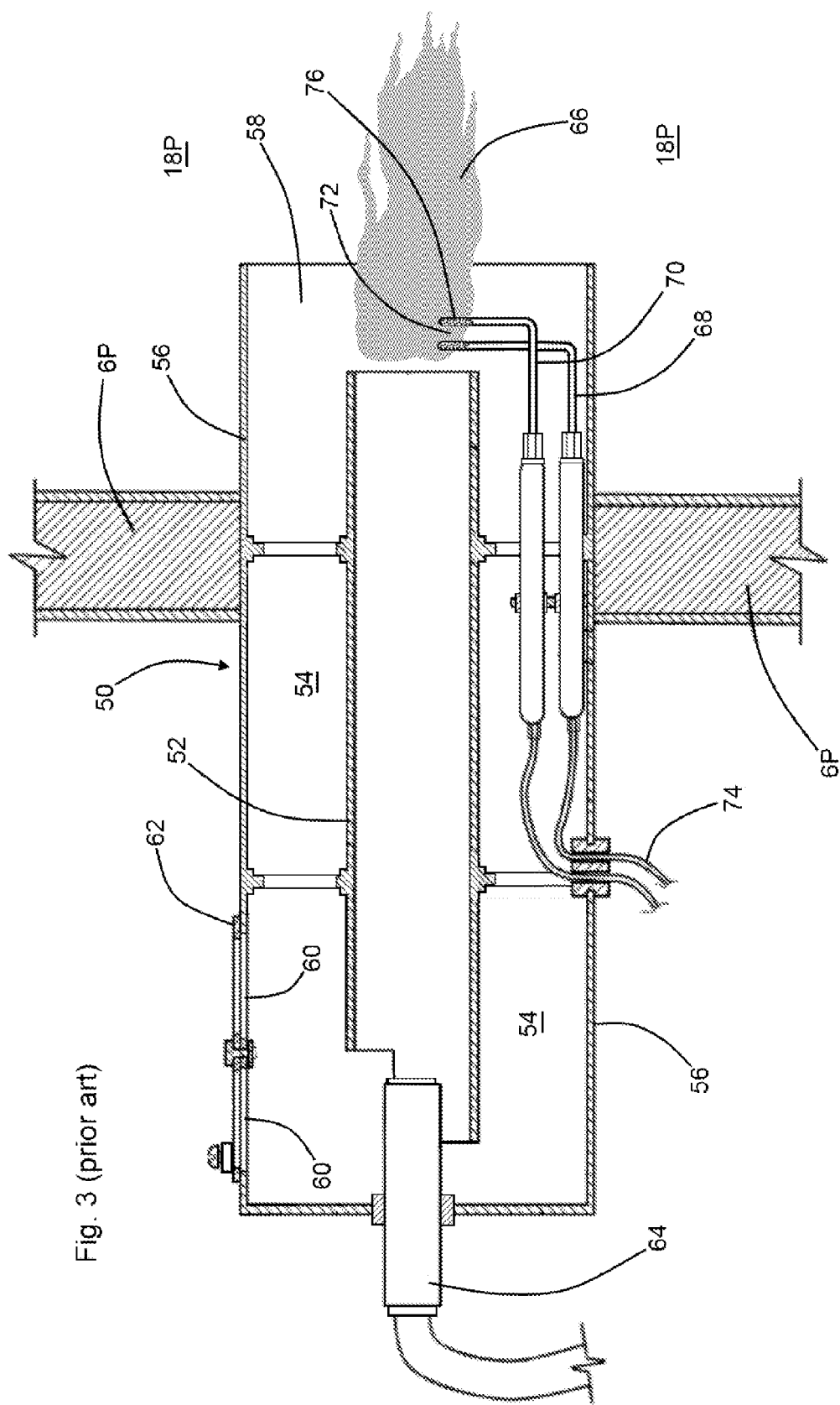
FIG. 3 is a prior art tunnel oven burner shown in accordance with the sectional view indicated in FIG. 2.

Referring further simultaneously to FIGS. 1 and 2, a prior art gas fired tunnel oven burner is referred to generally by Reference Arrow 50. Such prior art burner has an interior natural gas or propane gas conveying burner tube 52 which is securely mounted within the interior 54 of a burner shell or housing 56. As depicted in FIG. 3, the shell 56 is, for the sake of example, box configured, and such box configuration is intended as being representative of circular cylindrical shaped casings.

Referring to FIGS. 2 and 3, the combination of the casing 56 and the gas conveying burner tube 52 configures and defines space 54 as an annulus about tube 52, such annulus having an inner opening 58. Annulus 54 preferably has an outer opening 60 which may be adjustably opened and closed by a turn plate 62. Alternatively, the annulus's outer opening may communicate with an air output of an electric motor powered burner blower (not depicted within views). Such prior art burner 50 is conventionally mounted upon a tunnel oven wall 6P, such wall 6P being structurally analogous with the oven case longitudinal wall 6 depicted in FIG. 2. As is shown in FIG. 3, the burner annulus 54 with its open inner and outer ends 58 and 60 opens a low pressure air volume 18A, such air volume being similar to the low pressure air volume 18 of the instant invention's baking case.

Referring to FIG. 3, natural gas or propane supplied by a combustible gas carrying line 64 emits at the inlet end of burner tube 52, and such gas travels inwardly via venturi effect through the bore of tube 52 to rightwardly emit at the tube's outlet end, such gas fueling a burner flame 66. In operation of gas fired burners such as prior art burner 50, it is desired that, upon extinguishment of flame 66, the supply of gas from gas line 64 be automatically terminated. In order to assure automatic gas cutoff upon burner flame extinguishment, a pair of metal electrodes 68 and 70 are known to be supported within the interior of case 56 so that the distal ends of such electrodes reside within the space normally occupied by flame 66. While flame 66 is present, a microcurrent of electricity may be continuously conducted across gap 72 between electrodes 68 and 70. As part of such electrical circuit, wire leads 74 may extend to an electronic control unit (not depicted within views) which controls an electrically actuated gas shut off valve (also not depicted within views). Such electronic controllers are known to be adapted for actuating such gas cutoff valve upon cessation of current within lead wires 74. Such cessation of current may advantageously coincide with an extinguishment of flame 66 which interrupts the microcurrent across gap 72 between electrodes 68 and 70.

Referring further to FIG. 3, the distal ends of electrodes 68 and 70 are depicted as being covered by electrically insulating deposits 76 which commonly accumulates as a result of carriage of foreign substances and matter within the combustible gas. Upon accumulation of such deposits 76 upon electrodes 68 and 70, the passage of electrical current between electrodes 68 and 70 undesirably terminates regardless of the presence or absence of flame 66. Thus, the accumulation of deposits 76 upon electrodes 68 and 70 undesirably causes gas supply to the burner 60 to terminate at random and undesired times, and without regard to the presence or absence of flame 66.

Referring simultaneously to FIGS. 2 and 3, space 18P (which is structurally analogous with the low pressure air volume 18 of FIG. 2) is typically difficult to access. Notwithstanding, upon fouling of electrodes 68 and 70, as depicted in FIG. 3, an operator must either access such space 18P for the performance of maintenance upon electrodes 68 and 70 or for their replacement, or the burner 50 must be withdrawn from wall 6P in order to access the electrodes. Such modes of electrode maintenance or replacement are not "user friendly" and undesirably require the services of an oven mechanic to deal with the problem of false oven shutdowns resulting from fouled electrodes.

Referring simultaneously to FIGS. 2 and 4, the alternatively configured gas burner of the instant inventive tunnel oven is referred to generally by Reference Arrow 80. All structures appearing in FIGS. 2 and 4 having the suffix "A" are configured substantially identically with similarly numbered structures appearing in FIG. 3. Unlike the prior art burner 50 of FIG. 3, no flame sensing or detecting apparatus resides within the instant inventive tunnel oven's relatively inaccessible low pressure air volume 18. Burner 80 preferably comprises an electronic optical flame sensor 82 which is mounted upon a light outputting end of a tubular periscope 84. The sensor 82 and periscope 84 are preferably mounted at the outer and relatively cool side of oven wall 6. According to the preferred tunnel oven configuration of FIG. 4, a lined aperture 86 opens the upper wall of burner shell 56A, and such aperture 86 receives and securely holds both the periscope 84 and the sensor 82. A substantially straight line of sight 88 exists within annulus 54A, such sight line extending from flame 66A to the inner end of the periscope 84. Visible and infrared light from flame 66A is advantageously reflected by an angled mirror 90 which is mounted at the inner end of the periscope 84. Such light 88 is redirected upwardly through the bore of periscope 84 to be sensed by the electronic optical flame sensor 82. Electrical lead wires 92 extending from sensor 82 preferably electronically communicate with an electronic control device (which is conventional and is not depicted within views) which controls an electrically actuated gas shut off valve for controlling the supply of gas to gas line 64A.

Referring simultaneously to FIGS. 2 and 4, it may be seen that, prior to any flame extinguishment, flame 66A may directly impinge against a provided flame deflector 23 which is mounted upon the outer wall of plenum 22. Flame deflector 23 prevents excess localized heating of the wall of plenum 22, and promotes even heat distribution within plenum space 28. Upon extinguishment of flame 66A, infrared and/or visible light from deflector 23 may continue to be detected by the flame sensor 82, such continued detection undesirably delaying the sensor's protective gas shut off actuating function. In order to prevent such undesired gas shut off delays, an optical flame sensor of the type which is capable of correlating an output signal with continued detection of an established flame flicker frequency or flicker rate of natural gas flames is preferably utilized. Optical flame sensors which generate a signal upon a termination of a particular heat or visible light signal may undesirably delay their detection of a flame extinguishment event, and the instant invention's correlation of the signal of the sensor with a combination of flame light and flicker rate advantageously prevents such false sensor operation events. Accordingly, incorporating a flicker rate recognition capability within the optical flame sensor 82 (such as is characteristic of optical flame sensors manufactured by BST Solutions GmBH) advantageously reduces such undesirable and potentially dangerous delays in gas supply cut off.

Referring simultaneously to FIGS. 2 and 4, a control housing 100 which protectively encloses components including the automatic gas shut off valve, a conveyor motor, and the electronic controller (not depicted within views) is preferably provided, such housing covering both the optical flame sensor 82 and the outer opening 60A of the annulus 54A of the burner's casing 56A.

Figure 5:
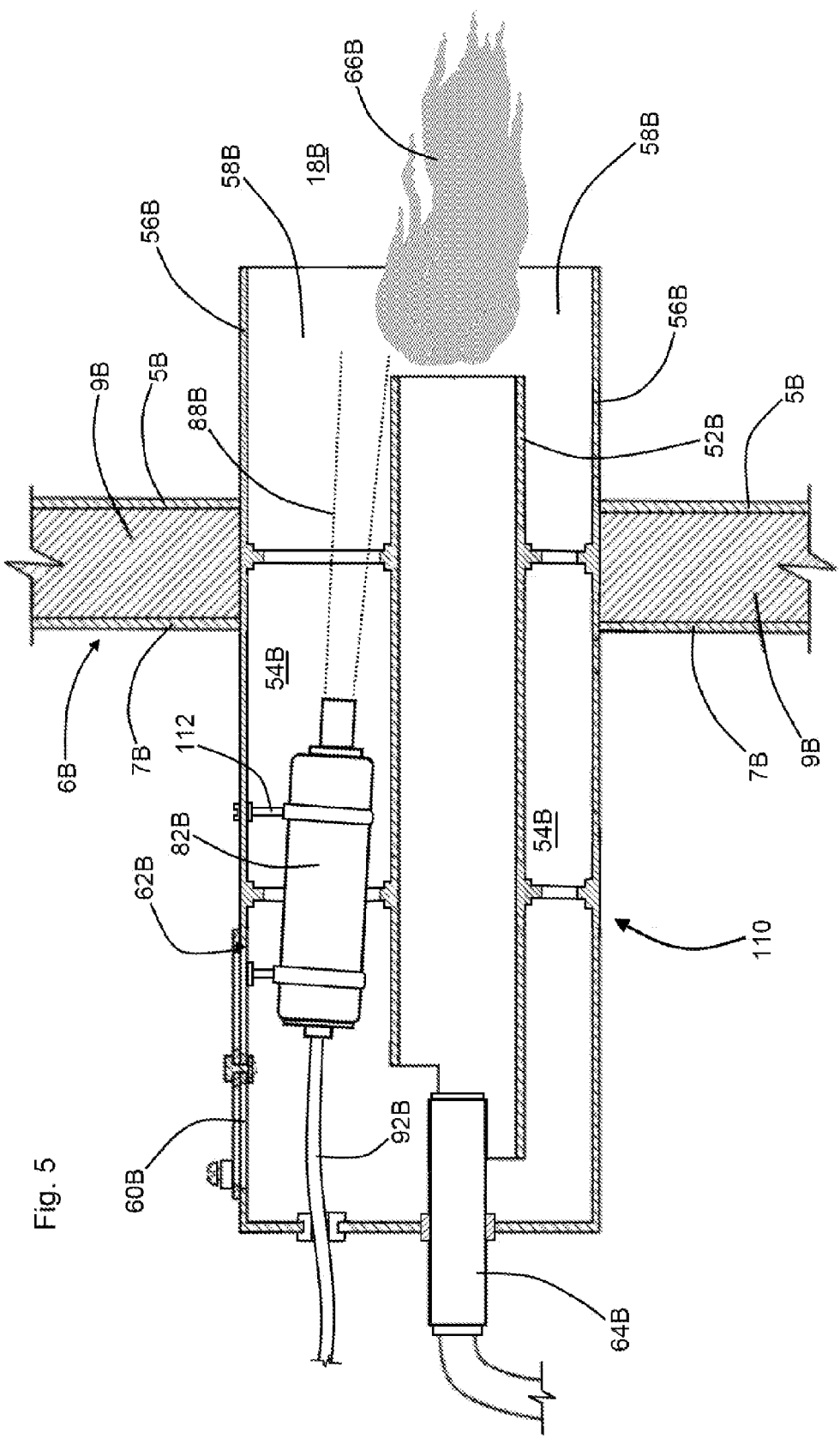
FIG. 5 presents an alternate configuration of structures depicted in FIG. 4.

Referring to FIG. 5, a tunnel oven including an alternately configured burner and optical flame sensor combination is referred to generally by Reference Arrow 110. In FIG. 5, each structure identified by a reference numeral having the suffix "B" is configured substantially identically with the similarly numbered structure appearing in Drawing FIG. 4. In the structural alternative of FIG. 5, the electronic optical flame sensor 82B is secured and positioned by mounts 112 directly within the outer end of annulus 54B. In such alternative configuration, light from flame 66B travels outwardly along annulus sight line 88B for direct detection by and signal actuation of optical flame sensor 82B.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. An air impingement tunnel oven comprising:
    (a) a baking case having an interior space defined by upper and lower walls, longitudinal and oppositely longitudinal walls, and lateral and oppositely lateral walls, the interior space comprising high and low pressure air volumes, the high pressure air volume being opened by longitudinal and oppositely longitudinal food passage ports;
    (b) a food conveyor spanning between the longitudinal and oppositely longitudinal food passage ports;
    (c) a plenum and impingement registers combination, said combination's impingement registers comprising upper and lower pluralities of finger ducts respectively overlying and underlying the food conveyor, each finger duct among the upper and lower pluralities of finger ducts being fixedly attached to and extending laterally from the plenum, the plenum being positioned between the baking case's high and low pressure air volumes;
    (d) a gas burner supported upon one of the baking case's walls, the gas burner comprising a shell and a flammable gas conveying tube within the shell, the shell and the flammable gas conveying tube defining an annulus, said annulus opening the baking case's low pressure air volume;
    (e) an electronic optical flame sensor operatively mounted within the control housing and outside the baking case and positioned for, upon operation of the gas burner for warming the low pressure volume, detecting burner flame light passing outwardly through the annulus;
    (f) electronic gas supply control means connected operatively to the gas burner, the electronic gas supply control means being adapted for actuation by the electronic optical flame sensor; and
    (g) a control housing fixedly attached to the one of the baking case's walls, the control housing covering the annulus's low pressure air volume opening; wherein the shell has a wall, and further comprising a periscope mounted upon said wall, the periscope having a light receiving end positioned within the annulus and a light emitting end positioned outside the shell, the electronic optical flame sensor's operative mount positioning said sensor at the periscope's light emitting end.

2. The air impingement tunnel oven of claim 1 wherein the electronic optical flame sensor's operative mount positions said sensor within the gas burner's annulus.

3. The air impingement tunnel oven of claim 1 wherein the electronic optical flame sensor is a wide band compact flame detector.

4. The air impingement tunnel oven of claim 3 wherein the optical flame sensor is adapted for flame flicker rate sensing.

* * * * *